Figure 3:
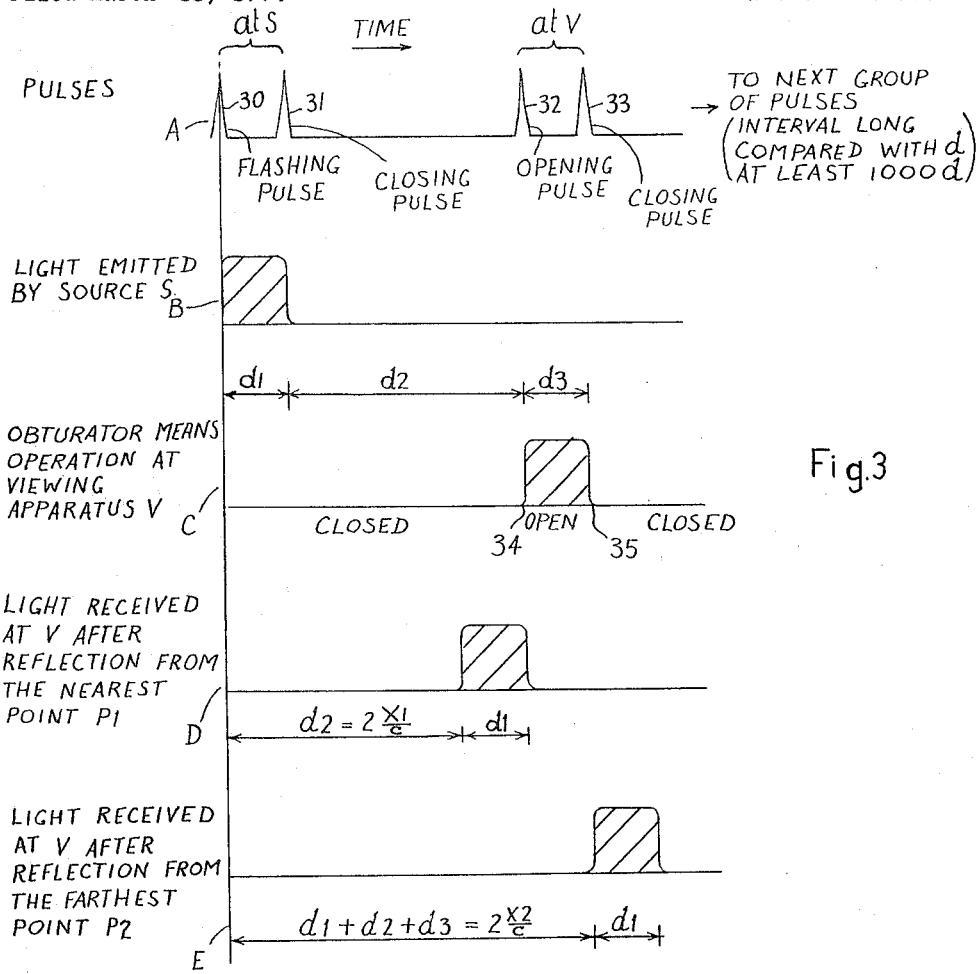

Dec. 27, 1966   A. VITKINE   3,294,002
APPARATUS FOR VIEWING OR PHOTOGRAPHING OBJECTS
Filed March 11, 1964   2 Sheets-Sheet 1
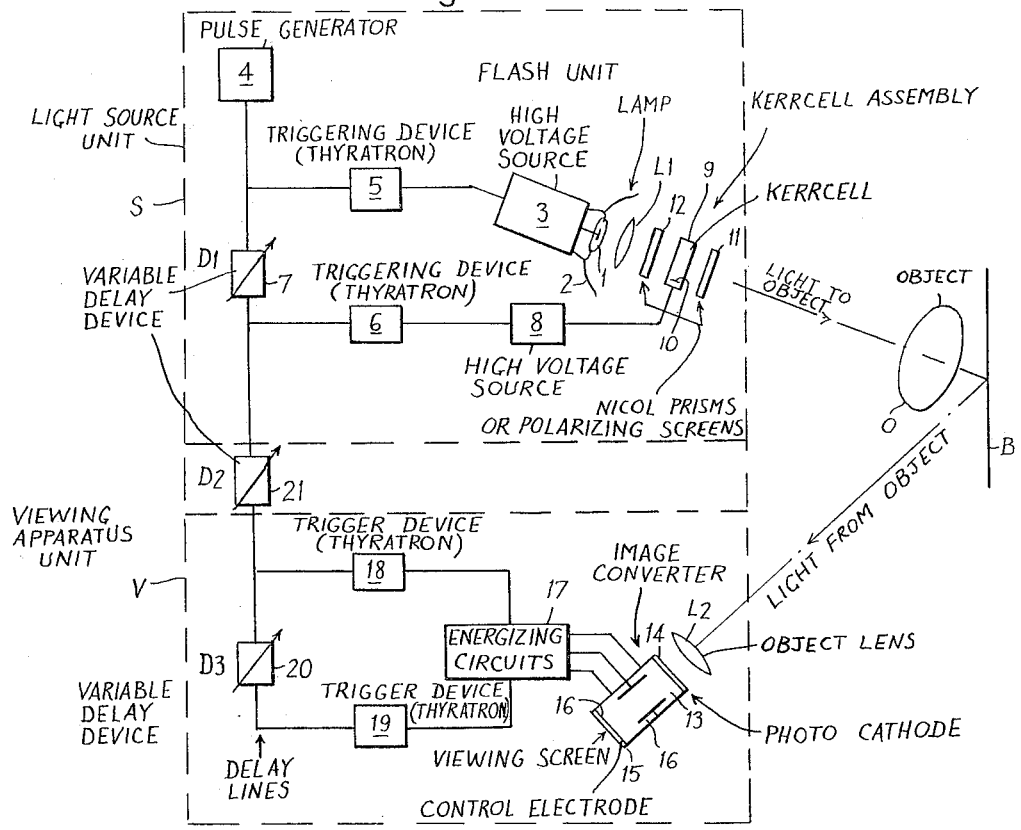
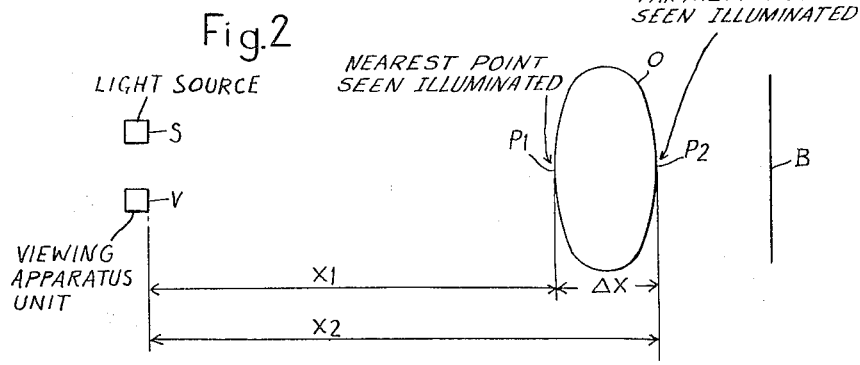
Inventor
A. Vitkine Dec. 27, 1966  A. VITKINE  3,294,002
APPARATUS FOR VIEWING OR PHOTOGRAPHING OBJECTS
Filed March 11, 1964  2 Sheets-Sheet 2

Inventor
A. Vitkine

United States Patent Office 3,294,002
Patented Dec. 27, 1966

3,294,002
APPARATUS FOR VIEWING OR PHOTOGRAPHING OBJECTS
Alexandre Vitkine, 66 Rue d'Aggresseau, Boulogne, France
Filed Mar. 11, 1964, Ser. No. 351,069
Claims priority, application France, July 7, 1960, 832,305
4 Claims. (Cl. 95—11.5)

This application is a continuation-in-part of application Serial No. 121,650, filed July 3, 1961, and now abandoned.

The present invention relates to apparatus for viewing or photographing objects.

The conditions for viewing and photographing an object are improved when it is illuminated differently from the area which surrounds it, because the object stands out better, for example, when illuminated, if it is seen against a dark background, or when not illuminated, if it is seen against a bright background.

If the space between the observer and the object contains diffusing particles (e.g. fog, snow or smoke in the case of the atmosphere or suspended matter in the case of water), the diffusion of the light by these particles produces a luminous veil in front of the object which disappears if the space in question is not illuminated.

The illumination of the object generally diminishes when the light source is moved away from it, but a different variation of this lighting, for example a lighting independent of the distance from the source or even increasing with this distance (or connected with it by any other law of the variation of illumination with distance), may be found useful in order to obtain certain viewing or photographic effects.

The invention has for a principal object to bring about, among other conditions, a contrast which is favourable for viewing and photography, the absence of embarrassing diffusion and the controlled distribution of the illumination for positions of the light source and the observer which does not generally allow such results to be obtained. In this way, for example, a light source placed near the observer can illuminate an object without illuminating the background behind the object.

The method and apparatus which essentially characterises the invention is based upon the combination of a lighting device producing illumination in short duration flashes of the order of a microsecond or shorter, and a viewing or photographing device which is obturated except during short duration periods, of the order of the flash duration periods but delayed in time with respect thereto by approximately the time which it takes for light from the source to travel to the object to be viewed and be reflected back to the viewing or photographing device.

To this end the invention makes use of the following means:

(a) A luminous source emitting one or a succession of luminous flashes of very short duration $t$ of the order of a microsecond or less, for example, a few millimicroseconds. Each flash produces a spherical luminous zone in space having the light source as a centre, the radius (radius of propagation) of which increases in accordance with the speed $c$ of light. The depth of this luminous zone, measured along an axis of propagation, is equal to $c \times t$, $t$ representing time. However it is as well to note that, in spite of its actual spherical shape, the above-mentioned luminous zone, seen by a hypothetical observer, would appear to be comprised between two concentric ellipsoids of revolution having the source and the observer as foci. The half-major axes of these ellipsoids differ from each other by $$\frac{c \times t}{2}$$

and increase at the speed $c/2$.

This is due to the time taken by the light to reach the observer after being reflected by the objects impinged upon in space by the light from the source.

(b) A visual viewing device or a photographic recording device comprising inertialess electronic obturator means which is closed while the luminous zone appears to traverse the zones in space the appearance of which is required to be dark and is opened only during the apparent travel of the luminous zone through the zone which is desired to be seen illuminated.

Electrical, radio or optical synchronization means (or a combination of these means) may be used for synchronizing the timing and duration of the flashes of the luminous source, and the timing and duration of the opening of the obturator means of the viewing device or photographic recording device, depending upon the zone or the object to be observed.

With these means, only those zones in space which appear to be traversed by the luminous zone during the time that the obturator of the viewing or photographic device remains open, are seen in the viewing device or photographically recorded.

In order to be able to select the different zones which can be seen or photographed, a variable delay means may be provided between switching circuits respectively controlling the operational periods of the light source and the viewing or photographing apparatus.

Figure 4:
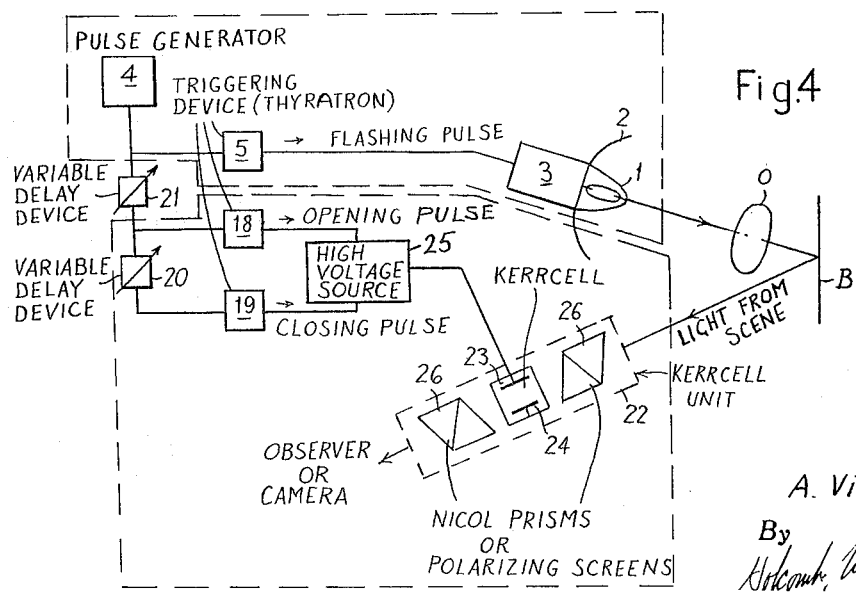

In order that the invention may be more clearly understood reference will now be made to the accompanying drawings showing some embodiments thereof together with explanatory diagrams, and in which:

FIGURE 1 shows a block schematic arrangement of apparatus according to a first embodiment, FIGURE 2 shows an explanatory diagram relating to the distance travelled by a pulse of light, FIGURE 3 shows a pulse sequence diagram, and FIGURE 4 shows part of a further embodiment.

Referring now to the drawings, FIGURE 1 shows a block schematic diagram of first embodiment of arrangement according to the invention, where a light source unit is shown in the dotted rectangle S and a viewing apparatus unit is showing in the dotted rectangle V. Referring first to the light source unit S, this comprises a flash lamp 1 mounted in a reflector 2, and fed by a high voltage source 3 in accordance with conventional practice for stroboscopic lamps. The lamp itself may be of any desired or known type for example, a xenon-filled tube having electrodes therein to allow an electrical voltage to be applied therebetween to produce a stress field causing the xenon gas to ionize and ignite during passage of the resultant current. The high voltage source 3 conventionally employs a capacitor (not shown) but since the arrangement of flash lamp and operating means are well known in the art it is not necessary to further describe them here. The capacitor is of the non-inductive type and, together with the flash lamp connected thereto as a load, forms a low impedance co-axial line. The reflector 2 directs the luminous flux towards the object to be illuminated. In order to effect firing of the lamp there is provided a main pulse generator 4 which may take any suitable form, suitable pulse generators being well known and described in many text books available in the electronic art. A triggering device 5 is connected in circuit between the pulse generator 4 and the voltage source 3 so as to send an opening trigger pulse to the source to initiate the flash from lamp 1.

In order to terminate the flash a further triggering device 6 also connected to the pulse generator 4, is used and which is arranged to terminate the flash after a predetermined period. This period is set by means of an adjustable delay device 7. The terminating or closing pulse provided by the triggering device 6 is caused to control a fast intertialess obturator means exemplified as high voltage source 8 combined with and for applying a polarising potential to close, a Kerr cell 9 having an electrode 10 therein, said cell normally being in the open condition to pass the flash on initiation. The Kerr cell 9 forms part of a Kerr cell assembly comprising the cell itself and two polarising screens or Nicol prisms 11 and 12 respectively located in front of and in back of the cell 9. Such Kerr Kerr cell arrangements are well known in the art and are used to apply the Kerr effect as is described in many text books and even in Webster's International Dictionary. A collimating lens $L_1$ may be interposed between screen or prism 12 and the lamp 1. Thus the triggering device 5 initiates the flash and the triggering device 6 terminates the flash after a period adjustable by means of the delay device 7. The duration of the flash can thus be made very short, for example, of the order of $20 \times 10^{-9}$ seconds.

The viewing apparatus unit V comprises in this embodiment a conventional image convertor 13 having a photo cathode 14, a viewing screen 15 and a control electrode 16. In front of the viewing screen or forming a part thereof is a further electrode 16 to enable a difference in potential to be applied to the tube between the photo cathode 14 and the electrode 16. The applied potentials are under the control of conventional polarising circuits schematically illustrated at 17. When at rest, the electrodes of the image converter are polarised so as to obturate the electronic emission from the photo-cathode. Such image converters with their control circuits are very well known in the art. Light reflected from the object O may be collimated by an object lens $L_2$.

The invention provides means for operating the image converter of FIGURE 1 for a specified period of short duration of the order of the duration of the flash produced by the lamp 1 but delayed in time with respect to this flash, this time being equivalent to the time taken by a pulse of light to travel from the lamp 1 to an object O located in front of a background B, and be reflected back to the image converter. It will be apparent that the positions of object O and background B are not scalar but only representational. The operative period of the image converter is controlled by an opening triggering device 18 and a closing triggering device 19, respectively connected to the polarising circuits 17 to polarise the electrode 16 for biasing the converter to the "ON" and "OFF" conditions. The time between the opening and the closing of the converter is adjustable by means of an adjustable delay device 20. According to the invention however the operating period of the image converter is delayed for a short time after the flash duration period of the lamp 1, and this delay is controlled by means of an adjustable delay device 21. This may be adjusted for example so that the normal operative voltages of the converter are established $25 \times 10^{-9}$ seconds after the beginning of the flash.

All the delay devices 7, 20 and 21 are controlled from the pulse generator 4 in accordance with known practice and the delay devices themselves may take any desired known form. For example, each delay device may be made up of a number of transmission line sections, each section comprising appropriately distributed inductance and capacitance, and combining switches to allow any selected combination of the sections, to produce a delay variable in discrete steps. Alternatively, a continuously variable delay line can be used for example of the mercury-filled type, wherein the length of a column of mercury is adjustable to vary the delay produced by the line.

The triggering devices 5, 6, 18 and 19 also may take any desired form and conveniently each of them may consist in a Thyratron tube with conventional associated circuits.

From the above description, it will be seen that both the Kerr cell arrangement and the image converter act as fast inertialess obturator means.

Referring now to FIGURE 2, which is a diagram illustrating the dimensional inter-relationship of the apparatus of the invention, with particular reference to FIGURE 1, the light source and the viewing apparatus are here respectively shown at S and V in simple block diagrammatic form. They are both assumed to be close together. The object O is shown with its nearest and farthest points or surfaces from the source S as $P_1$ and $P_2$ respectively and the background is again shown at B. The drawing dimensions are as follows:

$X_1$ represents the distance of the nearest point $P_1$ to be seen illuminated, $X_2$ represents the distance of the farthest point $P_2$ to be seen illuminated, and $\Delta$ represents the depth of illuminated zone.

Now, if $c$ is the speed of light, then the dimensions above can be aquated as follows:

$$X_1 = \frac{c}{2} \times d_2$$

$$X_2 = \frac{c}{2}(d_1 + d_2 + d_3)$$

$$\Delta X = \frac{c}{2}(d_1 + d_3)$$

Where $d_1$ is the delay introduced by the adjustable delay line 7, $d_2$ is the delay introduced by the adjustable delay line 21, and $d_3$ is the delay introduced by the adjustable delay line 20.

If the light source unit S and the viewing apparatus unit V are not close together, the above formulae are still valid, X in this case being the average distance of P to S and V and $$X_1 = \frac{SP_1 + P_1V}{2}$$

and $$X_2 = \frac{SP_2 + P_2V}{2}$$

$P_1$ and $P_2$ are not strictly speaking points, but are surfaces being parts of concentric ellipsoids of revolution having S and V as foci.

FIGURE 3 is a diagram of the opening and closing pulses provided by the arrangement of FIGURE 1, the diagram being arranged as a family of graphs one above the other to indicate the interrelated time sequences, time being indicated on the X axis.

Graph A shows the opening and closing pulses for operating the light source and the viewing device in relation to time. Pulse 30 is the purse for initiating the flash from lamp 1 as controlled by the triggering device 5. Pulse 31 is the closing pulse for the lamp 1 controlled by the triggering device 6. Pulse 32 is the opening pulse for polarising the image converted 13 in the "ON" condition as controlled by the triggering device 18, and pulse 33 is the closing pulse for polarising the image converter 13 to the "OFF" condition and controlled by the triggering device 19.

Graph B shows a representation of the pulse of light emitted by the lamp 1.

Graph C shows the relative times at which the viewing apparatus is ON and OFF, the opening occurring at point 34 and the closing occurring at point 35. The graph also indicates the delay periods $d_1$, $d_2$ and $d_3$ as between the light shown in Graph B and the image converter operation shown in Graph C.

Graph D shows the light received at the viewing apparatus after reflection from the nearest point $P_1$ and Graph E shows the light received at the viewing apparatus V as reflected from the furthest point $P_2$, the graphs D and E also indicating the delay relationship between these operations and conditions.

The apparatus of FIGURE 1 enables the object to be viewed completely disassociated from the background B. Thus, for example the object O may appear to be illuminated and the background completely dark, or vice versa. The relative distances and dimensions of the object from the background may be as desired, for example, the front point or surface $P_1$ can be 3 metres from the lamp 1, and the rear point or surface $P_2$ can be 4 metres from the lamp, the background B being 2 metres behind the object with respect to the lamp 1.

The group of pulses represented in FIGURE 3 may be repeated as required for direct viewing or for cinematography as will be explained later. The interval between pulse groups is made long compared with the delay $d_1$, preferably at least 1000 times $d_1$, but the repetition frequency is as high as possible, bearing in mind the deionisation time of the thyratrons and of the flash tube.

The viewing screen 15 of the image converter may be directly viewed by an observer or it may be photographed by a conventional still or cine camera arrangement to make a record of the light emanation, or alternatively the image converter 13 may include a holding device for a photographic medium so that the electrical image produced by the photo-cathode 14 may be recorded on the medium in accordance with known practice. Alternatively again the image converter may form part of a television-type picture tube with appropriate target and scanning means to produce a video wave form for transmission to a remote place for display upon a receiver screen also in accordance with known practice, and thus including a target and a scanning gun such as in the well known Image Iconoscope or Super Iconoscope.

The image of the illuminated zone is viewed or photographed surrounding the object O, said zone being transformed into a dark zone about one metre behind the object.

The apparatus schematically shown in FIGURE 1 can be modified in certain respects. For example the Kerr cell assembly 9, 10, 11, 12 may be omitted if a shaper cut-off of the length of the pulse of light produced by the lamp 1 then is obtainable, is not desired.

Moreover the image converter tube 13 may be replaced by a Kerr cell arrangement, as shown in the embodiment of FIGURE 4. In this figure, the pulse generator is again shown at 4 with the flash lamp 1, reflector 2, and high voltage source 3. In this figure also, no Kerr cell arrangement is provided for effecting rapid termination of the flash produced by lamp 1, the flash intensity being allowed to decay naturally. However, the triggering device 5 is used to initiate the flash discharge as in the arrangement of FIGURE 1.

A viewing device shown in the dotted rectangle 22 and includes a Kerr cell 23 having a control electrode 24 operated from a high voltage source 25 and having Nicol prisms or polarising screens 26 and 27 respectively located in front of and in back of the Kerr cell to receive the light reflected from the object O. The light passed through the Kerr cell arrangement may be observed by an observer directly or as desired on a viewing screen (not shown) or this light may be recorded on a photographic medium if it is desired to retain a record of the light emanation. The photographic medium can be located in a still or cine camera device of any known kind which therefore has not been illustrated.

Between the pulse generator and the viewing device is provided a variable delay line 21 as in the arrangement of FIGURE 1, so that the delay between the termination of the flash and the opening of the Kerr cell arrangement 23 can be varied. Again similarly as in FIGURE 1 a variable delay line 20 is provided to effect closing of the Kerr cell unit 23. The delay lines 21 and 20 respectively energise triggering devices 18 and 19 the function of which is to effect and terminate operation of the high voltage source 25 to open and close the Kerr cell arrangement in a fashion similar to the operation referred to in connection with FIGURE 1.

The light source 1 has been referred to as a flash tube of the conventional xenon filled type, the flashes given by it in the devices at present on the market have a duration of the order of $10^{-8}$ seconds with a fast rise by and a relatively slow decay time. A time of $10^{-8}$ seconds corresponds to an apparent depth of the luminous zone $$\frac{c \times t}{2}$$

of 1.5 metres and varies as a function of the length of time for which the received image is available for observation or photographing. The actual duration of the flash may be reduced by appropriate selection of the size and electric characteristics of the lamp and of its operational circuits, the time constant of which must be as small as possible. Alternatively, any other short-duration light source may be used, for example a Fisher-type lamp as described in the Journal of the Optical Society of America, vol. 47, page 981 (1957) or vol. 51, page 543 (1961), or a spark-gap illuminator. If a suitable short time constant for the purpose in hand is not attainable by the lamp tube, or other illuminator, and associated apparatus available, then recourse can be had to the inertialess obturator means such as a Kerr cell arrangement referred to above. The use of the Kerr cell arrangement will enable fine adjustment of the depth of the light zone for illumination of the object.

In order to take a still photograph, either a succession of flashes, which are maintained throughout the necessary exposure time, or even a single flash may be used. Where a succession of flashes is used, the repetition frequencies of the flashes and the obturator operations should be equal or equal to or multiples of each other in order to make sure that the images of the illuminated zones are immobile.

For visual observation or cinematography, a prolonged succession of flashes is required and the repetition frequencies of these flashes must be fairly high in order to avoid image flicker. However, the repetition frequencies need not necessarily be equal to or multiples of each other, but a small difference in the repetition rate will cause a slow displacement of the illuminated zone in the image.

In the case of movable objects or objects the exact position of which is not known in advance, a control of the flashes or of the obturator operations, or both, by the light reflected by the object allows the image of the illuminated zone to be maintained in a position defined in relation to the object observed. This control may be completed by the automatic control of the directions of sighting of the source and of the observation device.

The intersection of the outer or inner surface of the luminous zone emitted by the source with the surface of an object, defines a line which is a sort of level-curve related to the ellipsoids of revolution having the source and the observers as foci.

By taking a series of photographs each corresponding to a different radius of the luminous layer, a series of lines defining the shape of the observed object is obtained.

I claim:

1. Apparatus for illuminating and forming an image of an object, comprising first electronically-controlled trigger means, second electronically controlled trigger means, an electronic pulse generator, means feeding pulses produced by said generator to trigger said first and second trigger means, a light source, means responsive to the triggering of said first trigger means to cause said light source to produce a light pulse, each time said first trigger means is triggered, of a time duration not in excess of the time light is seen from the apparatus to travel through the area to be seen illuminated, an image-forming apparatus for producing an image of the object and including obturating means for obturating the light reflected from the object, means responsive to the triggering of said second trigger means to open said obturating means, each time said second trigger means is triggered, for a short time duration of the order of the time duration of a light pulse, and variable delay means interposed in the feeding means to delay the time instants at which said second trigger means is triggered by said pulses relative to the instants at which said first trigger means is triggered by said pulses, the delay produced by said delay means corresponding approximately to the time required for the light to travel from the source to the object to be illuminated and from there to the image forming apparatus.

2. Apparatus as set forth in claim 1, wherein said second trigger means includes a first trigger circuit to open said obturating means, a second trigger circuit to close said obturating means, and an adjustable delay means between said first and said second trigger circuits in said second trigger means, to adjust said delay to be not in excess of the time light from the source would be seen from the apparatus to travel through the area to be seen illuminated.

3. Apparatus as set forth in claim 1, wherein said first trigger means include a first trigger circuit to initiate the light pulse, a second trigger circuit to cut off the light pulse, and an adjustable delay means between said first and said second trigger circuits in said first trigger means, to adjust said delay to be not in excess of the time light from the source would be seen from the apparatus to travel through the area to be seen illuminated.

4. Apparatus as set forth in claim 2, wherein said first trigger means includes a first trigger circuit to initiate the light pulse, a second trigger circuit to cut off the light pulse, an and adjustable delay means between said first and said second trigger circuits in said first trigger means, to adjust said delay to be not in excess of the time light from the source would be seen from the apparatus, to travel through the area to be seen illuminated.

References Cited by the Examiner
UNITED STATES PATENTS

| | | | |
|---|---|---|---|
| 2,664,795 | 1/1954 | Tone | 95—11.5 |
| 3,030,852 | 4/1962 | Courtney-Pratt | 95—53 X |
| 3,039,375 | 6/1962 | Umback | 95—11.5 |

JOHN M. HORAN, *Primary Examiner.*